United States Patent [19]

Sidles et al.

[11] 4,351,789
[45] Sep. 28, 1982

[54] MOLD AND PROCESS FOR MOLDING

[75] Inventors: James Sidles, Richfield; Jerome J. Blayne, Brecksville, both of Ohio

[73] Assignee: The B. F. Goodrich Company, Akron, Ohio

[21] Appl. No.: 286,782

[22] Filed: Jul. 27, 1981

[51] Int. Cl.³ .............................................. B29H 5/02
[52] U.S. Cl. .................................. 264/130; 425/28 R; 425/812; 249/141; 264/325; 264/326
[58] Field of Search ....................... 264/130, 325, 326; 249/141, 114; 425/28 R, 812, 556, 36

[56] References Cited

U.S. PATENT DOCUMENTS 3,467,989  9/1969  Youngblood et al. ................ 425/36
3,854,852  12/1974  Carter ................................... 425/812
3,891,363  6/1975  Sievers et al. ..................... 425/28 R
3,989,430  11/1976  Dailey ................................ 425/28 R Primary Examiner—J. Howard Flint, Jr.
Attorney, Agent, or Firm—James R. Lindsay

[57] ABSTRACT

When molding rubber or plastic articles in a closed mold, a film of a liquid coating material having a boiling point above the ambient temperature of the work area and below the temperature at which the molding is to occur is applied to the surface of the mold cavity and/or the surface of the article to be molded just before the mold is closed. The mold cavity then is heated to a temperature above the boiling point of the liquid coating material. The pressure maintaining the mold closed is suddenly reduced exposing vapor release passages between mating surfaces of the mold segments. The liquid coating material at the elevated temperature and reduced pressure within the mold cavity rapidly vaporizes and exhausts through the vapor release passages flushing air entrapped within the mold cavity when the mold was closed from the mold cavity. The mold once again is closed before air can seep back into the mold cavity. Normal molding procedures thereafter are followed.

9 Claims, 6 Drawing Figures

MOLD AND PROCESS FOR MOLDING

BACKGROUND OF THE INVENTION

When molding articles from rubber or plastic materials within closed molds wherein a blank of rubber composition or plastic composition or a pre-formed partially-shaped rubber or plastic article is placed into the mold cavity of a multi-section mold and the mold then is closed, air usually is entrapped within the mold cavity as the mold is closed. Unless the entrapped air is exhausted from the mold cavity, the entrapped air can prevent the rubber or plastic composition from flowing and fully filling the mold cavity. When this occurs, the molded article does not conform in detail to the desired shape and, depending upon the severity of the defect, must be scrapped or sold as a "blemished" product. Although the problem is not experienced if the pressure within the mold cavity of the closed mold is sufficiently high to force the entrapped air to become absorbed into the rubber or plastic molding composition during the molding operation, in many molding situations the necessary high pressures are not desirable or cannot be tolerated.

One method which has been used to overcome the problem involves drilling a number of small vent holes (commonly about 2 millimeters in diameter) through the walls of the mold at those areas of the mold cavity at which air pockets normally are formed as the mold is closed. In the use of such vent holes, as the rubber or plastic composition flows to fill the mold cavity, the entrapped air is forced ahead of the flowing rubber or plastic composition and is forced to exit from the mold cavity through the vent holes. The rubber or plastic composition flows into the vent holes producing rubber or plastic vent hole plugs which form a part of the surface of the molded product. The initial cost of drilling the numerous vent holes in the mold is substantial. Also, some of the plugs of rubber or plastic formed in the vent holes may break from the molded article as the article is separted from the mold leaving the plugs lodged within the vent holes, making it necessary periodically to re-drill the vent holes to remove the plugs. The vent hole plugs which remain as part of the surface of the molded article are unsightly and for aesthetic considerations are removed, usually by cutting, from the article thereby adding expense to the manufacturing cost.

U.S. Pat. No. 3,989,430 describes some disadvantages and problems resulting from the formation of the vent hole plugs during the molding of rubber tires and suggests inserting nails into the vent holes which (nails) have nail heads that have an irregular undersurface to allow air to escape into the vent holes but prevent rubber composition from flowing into the vent holes to form plugs. The procedure suggested does not eliminate the necessity of drilling the vent holes in the tire mold initially, however, and raises the possibility of nails being pulled accidentally from the vent holes when the tire is removed from the mold, particularly after the mold has been in use for a long period of time.

SUMMARY OF THE INVENTION

The present invention provides a process for removing objectionable air trapped within a mold cavity as the mold is closed without requiring the provision of the conventional vent holes in the mold sections. In accordance with the present invention, a liquid material having a boiling point above the ambient temperature of the work area and below the temperature at which the article is molded is deposited on the surface of the mold cavity and/or the surface of the blank from which the article to be molded just before or as the mold is being closed. The closed mold, held in the "closed position" by externally-applied pressure forcing the platens together (in a "platen press" mold) or by bladder inflation pressure with or without other externally-applied pressure (in a bladder tire curing press), then is heated to cause the temperature within the mold cavity to rise to a temperature above the boiling point of the liquid coating formed on the mold cavity surface and/or blank to be molded, with an attendant increase in pressure within the mold cavity due to the temperature rise therein. The pressure maintaining the mold in the closed position is temporarily released allowing the platens or mold segments to move apart slightly and the bladder (in a bladder press) to retract slightly to cause vapor release passages to be exposed. At the elevated temperature and reduced pressure within the mold cavity, the liquid coated on the surface of the mold cavity and/or the blank within the mold flash-vaporizes and exhausts through the vapor release passages, exhausting with it air that was entrapped within the mold cavity when the mold initially was closed. The mold after a brief period of pressure reduction is again closed by reapplying the "closing pressure" to the mold. The "closing pressure" can be temporarily reduced one or more times to exhaust additional vapor from the mold cavity if the first vapor bleeding did not remove a sufficient amount of the liquid coating material and entrapped air from the mold cavity.

DETAILED DESCRIPTION OF THE INVENTION

Figure 1:
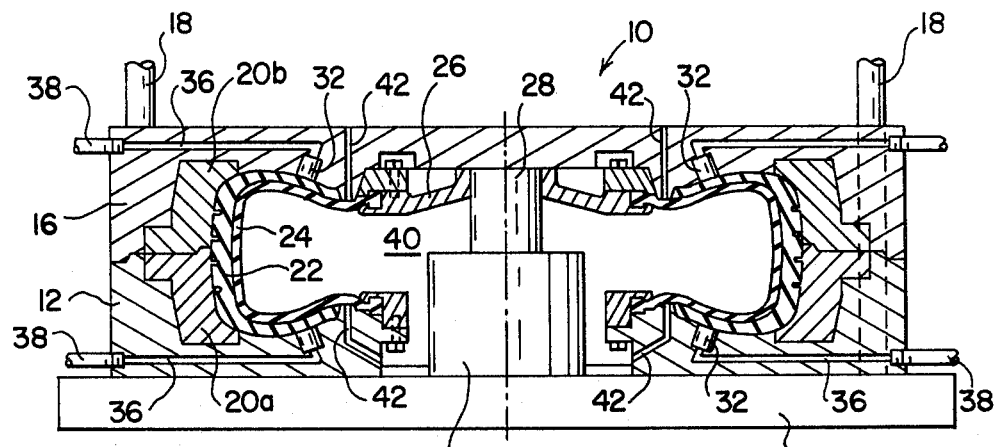
FIG. 1 is a side elevation view, in section, of a bladder tire curing press in the closed position with a tire being molded therein, the press being constructed to employ the present invention.

In carrying out the molding process of the present invention, a liquid material that has a boiling point above the ambient temperature of the work area but below the temperature at which the article is to be molded (the "molding temperature") is applied to the surface of the mold cavity of the mold or to the surface of the blank to be molded within the mold or to both the surface of the mold cavity and the surface of the blank just before or as the mold is closed. The liquid coating material can be applied to the surface of the mold cavity and/or to the surface of the blank to be loaded, or which already has been loaded, into the mold by any convenient manner, such as by brushing or spraying the liquid material onto the appropriate surface.

The composition of the liquid coating material can vary depending upon the ambient temperature of the work area and the temperature within the mold at which the molding operation is to be carried out. Usually, the ambient temperature of the work area will vary from about 20° C. to 50° C., depending upon seasonal temperatures. Although liquid materials that have boiling points only slightly above the ambient temperature of the work area and only slightly below the molding temperature can be used, desirably a liquid material having a boiling point at least 10° C. above the ambient temperature of the work area and at least 10° C. below the temperature at which the product is molded is employed. The temperature of molding the article will vary depending upon the composition being molded, but usually a temperature of 120° C. or above is used. Preferably, the liquid coating material is water or an aqueous solution. Since it is desirable that the liquid coating material form a thin film over the mold cavity surface and/or the surface of the blank to be molded, a surfactant (such as an alcohol or a fatty acid soap) desirably is added to the liquid coating material to insure "wetting" of the surface to be coated, or, in the alternative, a thin coating of a surfactant is applied to the mold cavity and/or blank to be molded before the liquid coating material is applied.

The mold sections or platens then are closed and held together by externally-applied pressure, or a combination of externally-applied pressure and a mechanical locking system, and the temperature within the mold cavity is raised (usually, by circulating steam through the platens or sections of the press or mold and also into the bladder chamber in a bladder type tire curing press) until the temperature is raised above the boiling point of the liquid coating material that had been applied to the surface of the mold cavity and/or surface of the blank to be molded just prior to closing the mold. An attendant rise in the pressure of any gaseous material within the mold cavity also occurs with the rise in temperature within the mold cavity. Once the temperature within the mold cavity has been elevated to above the boiling point of the liquid coating material, and preferably to a temperature at least 10° C. above the boiling point of the liquid coating material, the externally-applied pressure maintaining the mold "closed" is suddenly reduced exposing vapor release passages through which vapor and gases can exhaust. At the raised temperature within the mold cavity and with the pressure within the mold cavity being reduced, the liquid film coated on the surface of the mold cavity and/or on the surface of the article blank flash-vaporizes and exhausts through the vapor release passages, exhausting with it air that was entrapped within the mold cavity when the mold initially was closed. As soon as the principal exhaust of vaporized liquid from the mold cavity is completed, the mold again is closed by re-asserting the externally-applied pressure before air reenters the mold cavity. If desired, the procedure of raising the temperature (and, therefore, the pressure) within the mold cavity and then reducing the closing pressure of the mold to permit any liquid remaining within the mold cavity to vaporize and exhaust from the mold cavity can be repeated.

The present invention is further evident from the following specific examples of use of the invention.

FIGS. through 4B illustrate use of the present process in molding and curing a tire. The bladder tire curing press 10 includes a bottom mold section 12 secured to base 14 and an upper mold section 16 mounted for vertical movement on guides 18,18. Mold inserts 20a,20b (frequently referred to as "tread rings") are secured within mold sections 12 and 16 and impart the desired tread pattern to tire 22 during the molding and curing of the tire within press 10. A generally cylindrical-shaped tire bladder 24 is secured along its upper peripheral zone to a retaining ring 26 affixed to post 28 slidably mounted within collar 30 secured within base 14. Bladder 24 is secured along its bottom peripheral zone to bottom mold section 12. Bottom mold section 12 and upper mold section 16 each are provided with one or more poppet valves 32,32 fitted into recesses 34,34 formed within the respective mold sections (12 or 16). Recesses 34,34 communicate with conduits 36,36 contained within bottom and upper mold sections 12 and 16. Conduits 36,36, in turn, communicate with piping 38,38. Poppet valves 32,32 conduits 36,36 and piping 38,38 provide means for introducing liquid coating material in vapor form (for example, steam) into the mold cavity of curing press 10 as the tire mold is being closed to coat the surface of the mold cavity and/or the outer surface of the "green" tire blank with a film of the liquid coating material. Although, tire press 10 is shown to have poppet valves 32,32 (with associated conduits 36,36 and piping 38,38) in both the bottom and upper mold sections (12 and 16) for introducing vaporized liquid coating material into the mold cavity, it will be appreciated that such assemblies for introducing vaporized liquid coating material into the mold cavity all can be located in either the bottom mold section 12 or the upper mold section 16 if the desired film coatings are realized. The number of such assemblies for introducing vaporized liquid coating material into the mold cavity also can vary depending upon the size of the mold cavity and the capacities of such assemblies. Bladder vent holes 42,42 in mold sections 12 and 16 allow air entrapped between the green tire blank and bladder 24 to escape as bladder 24 "expands" into the mold cavity to shape the tire blank into the desired tire contour. When bladder 24 is fully extended into the mold cavity, bladder vent holes 42,42 are covered by bladder 24.

Figure 2:
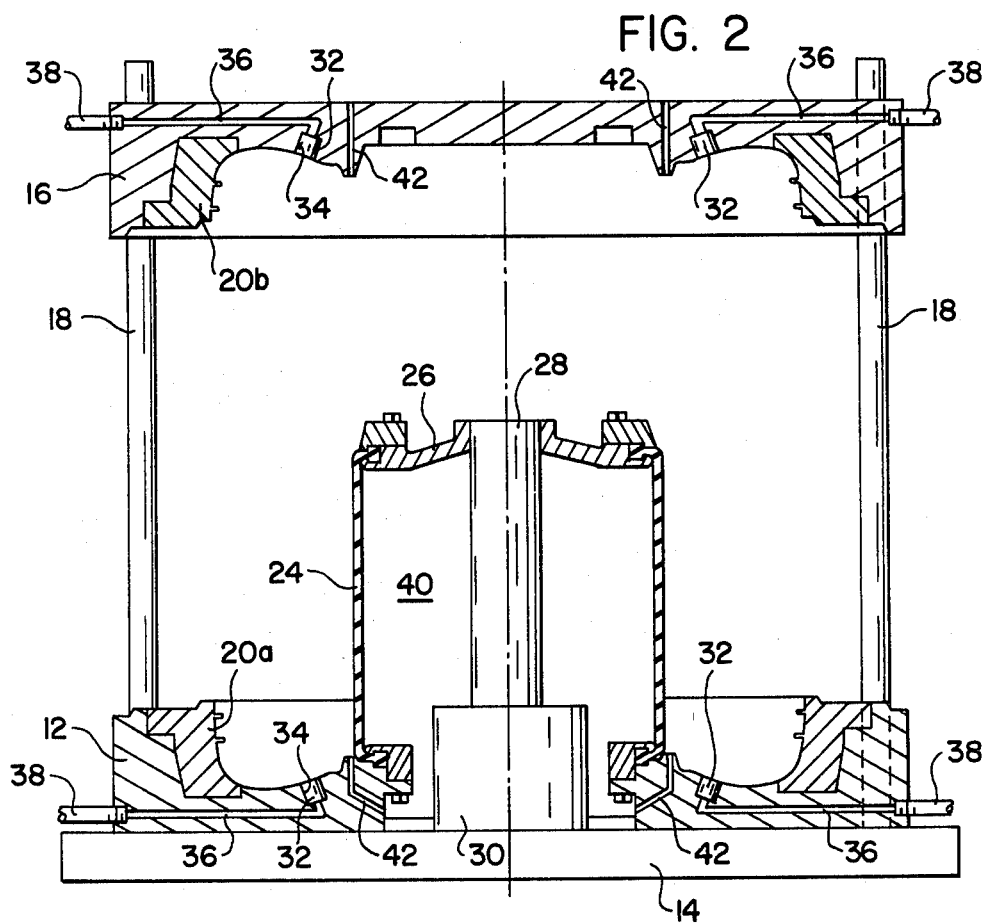
FIG. 2 is a side elevation view, in section, showing the bladder tire curing press of FIG. 1 in the fully open position.
Figure 3:
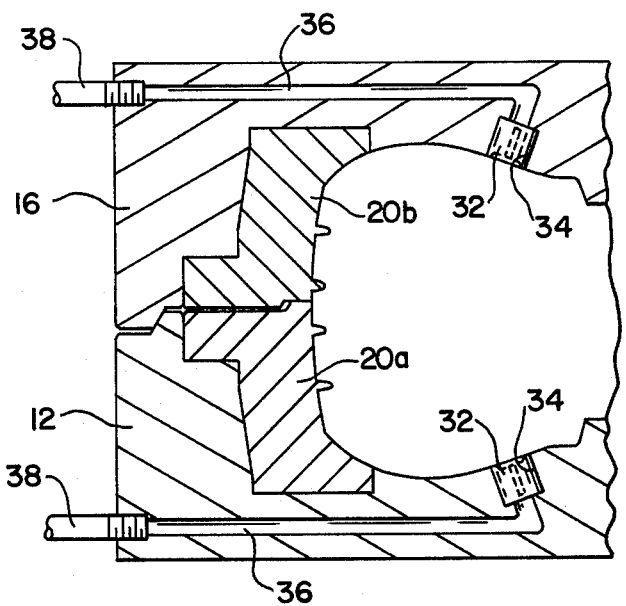
FIG. 3 is a fragmentary view, in section, of the bladder tire curing press shown in FIG. 1.
Figures 4A, 4B:
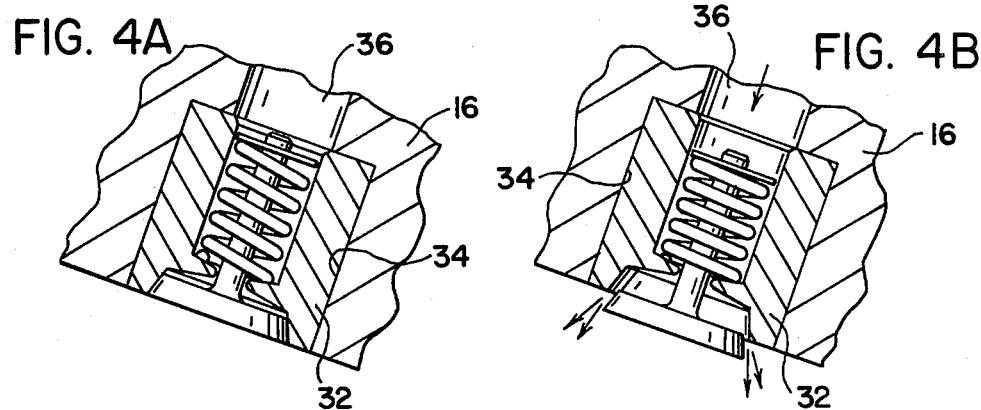
FIG. 4A is a fragmentary view, in section, illustrating one of the poppet valve assemblies shown in FIG. 3, the poppet valve being shown in the "closed" position.
FIG. 4B is a fragmentary view, in section, illustrating the poppet valve assembly shown in FIG. 4A in an "open" position.

In utilizing the tire curing press 10, a green tire blank having a generally hollow-cylinder shape and which may be coated with a surfactant is fitted over bladder 24 with press 10 in the open position shown in FIG. 2. Upper mold section 16 is lowered toward bottom mold section 12. Saturated steam, typically at a temperature of about 198° C. (201 psig), is introduced into the bladder chamber 40 as the upper mold section 16 moves toward the bottom mold section 12 and post 28 is moved downward within collar 30 causing bladder 24 to "expand" into the mold cavity and shape the green tire blank to the general configuration of a tire. During this shaping operation, the pressure within bladder chamber 40 usually is maintained at a relatively low level (for example, a pressure of 15–20 psig) so as not to misshape or rupture the tire blank as it is shaped to the desired tire configuration. Thereafter, the pressure within bladder chamber 40 can be allowed to increase. When the upper mold section 16 is moved almost to the closed position, vaporized coating material under pressure (for example, steam) is fed to piping 38,38, through conduits 36,36, through poppet valves 34,34 (which have been urged by the vaporized coating material under pressure to the open position, as illustrated in FIG. 4B) and into the mold cavity of press 10 producing a film of the liquid coating material on the surface of the relatively cool green tire blank and on the exposed surface of the mold cavity (if the temperature of the mold cavity surface is below the boiling point of the liquid coating material). The vaporized coating material is fed into the mold cavity at least until the tire press 10 is nearly "closed" before flow of the vaporized coating material into the mold cavity of press 10 is terminated. Bottom mold section 12 and upper mold section 16 then are heated by supplying saturated steam, typically at a temperature of about 180° C. (131 psig), to the mold sections 12 and 16, while maintaining the supply of saturated steam to bladder chamber 40. As a consequence of supplying heat to mold sections 12 and 16 and bladder chamber 40, the temperature within the mold cavity of tire press 10 increases with an attendant increase in the pressure within the mold cavity. When the temperature within the mold cavity has increased to a temperature above the boiling point of the liquid coating material sprayed into the mold cavity just as the tire press was closed (preferably to a temperature at least 10° C. above the boiling point of the liquid coating material) and before the rubber tire composition is cured, significantly, the pressure holding mold sections 12 and 16 together and/or the pressure within bladder chamber 40 is substantially reduced (desirably to a pressure of from 0 to 30 psi above the ambient pressure of the work area). The reduction of pressure causes the green tire to contract slightly away from the surface of the mold cavity exposing vapor release passages between the mating irregular surfaces of mold sections 12 and 16 from which vapor and gases can exhaust from the interior of the mold cavity and causes bladder 24 to contract slightly away from the interior surface of the green tire and the surface of the mold cavity to provide vapor release passages leading from the mold cavity to bladder vent holes 42,42 through which vapor and gases can exhaust. The liquid coating material on the surface of the mold cavity and/or surface of the green tire blank at the reduced pressure within the mold cavity and temperature above the boiling point temperature of the liquid coating material vaporizes and expands essentially instantaneously. The vapor exhausts rapidly from the mold cavity to the ambient atmosphere through the vapor release passages present between the mold sections and the vapor release passages leading to bladder vent holes 42,42. The rapid exhaust of the vaporized coating material from the interior of the mold cavity sweeps air that was entrapped within the mold cavity when the mold was closed from the mold cavity. The reduced pressure is maintained only for a short period (usually 1 to 5 seconds) and then is re-applied so that the tire press 10 is returned to the closed position before air can re-enter the mold cavity. Heat once again is supplied to the tire press 10. With essentially all of the air exhausted from the mold cavity the green tire blank now is able to "completely" fill the mold cavity, the small amount of vaporized coating material remaining within the mold cavity condensing as a thin liquid film on the surface of the mold cavity and/or tire surface. A normal curing cycle for vulcanizing the tire 22 then is followed (for example, curing the green tire for about 15 minutes to about 14 hours depending upon the size of the tire at a molding temperature of from 120° C. to 205° C.).

Figure 5:
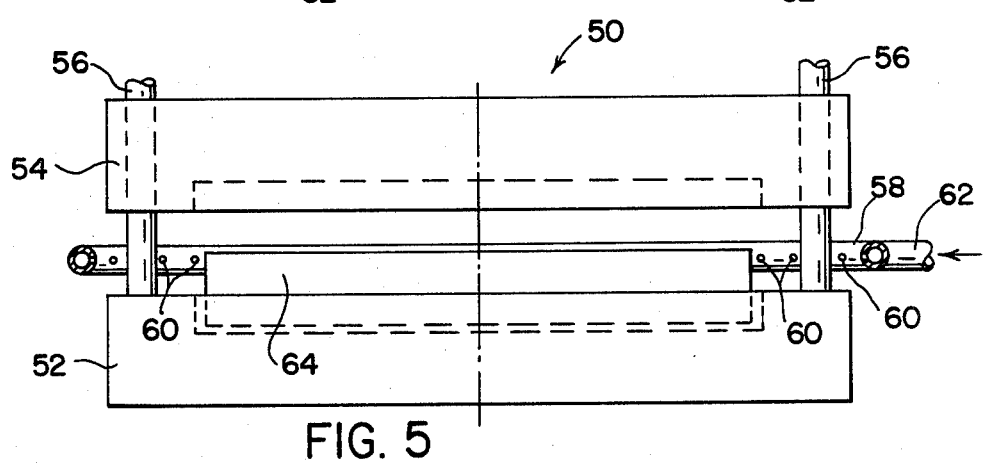
FIG. 5 is a side elevation view of a platen press mold illustrating a second manner of utilizing the present invention.

FIG. 5 illustrates a platen press 50 comprised of a bottom platen 52 and an upper platen 54 mounted for vertical movement on guides 56,56. Press 50 includes a pipe "ring" 58 encircling platens 52 and 54 and positioned closely adjacent to the space formed between platens 52 and 54 when spaced apart a slight distance (for example, a distance of 10 to 20 cm.). Pipe ring 58 has openings 60,60 facing in the direction of the space formed between platens 52 and 54 when slightly spaced apart, so that a liquid coating material in vapor form (steam, for example) can be supplied via pipe 62 to pipe ring 58 and discharged through openings 60,60 into the space between platens 52 and 54 to apply a film of the coating material on the surface of the mold cavity of press 50 (if the temperature of such surface is below the boiling point of the coating material) and/or on the surface of a rubber or plastic molding blank 64 within the mold cavity just before press 50 is closed. When press 50 has been moved to the "closed position" by application of externally-applied pressure, the temperature within the mold cavity is raised by flowing steam through platens 52 and 54. The temperature within the mold cavity of press 50 desirably is raised to a temperature at least 10° C. above the boiling point of the coating material on the surface of the mold cavity and/or the surface of blank 64, with an attendant increase in the pressure within the mold cavity of press 50. The externally-applied pressure urging platens 52 and 54 together then is rapidly reduced before blank 50 has vulcanized significantly or otherwise set allowing platens 52 and 54 to move slightly apart exposing vapor release passages that exist between the irregular mating faces of platens 52 and 54. The coating material on the surface of the mold cavity of press 50 and/or on the surface of blank 64 vaporizes rapidly and exhausts through the exposed vapor release passages and, in so doing, flushes air that had been trapped in the mold cavity when press 50 was closed from the mold cavity. Press 50 is returned to the "closed position" immediately after the exhaust of vaporized coating material from the mold cavity has substantially subsided (usually within about 1 to 5 seconds after the pressure is reduced) and before air from outside the press 50 is drawn back into the mold cavity. The heating of the interior of the mold cavity and subsequent release of pressure to cause exhausting of vapor coating material from the mold cavity can be repeated, if desired. The temperature within the mold cavity then is raised to the molding temperature with the desired externally-applied pressure exerted to maintain platens 52 and 54 closed and a normal molding cycle is followed. The molding temperature and time for accomplishing the desired molding will vary depending upon the size of the blank to be molded and the composition of the blank. Typically, rubber compositions are molded at temperatures ranging from about 135° C. to 205° C. and plastic materials at temperatures ranging from about 120° C. to 158° C. depending upon the specific material involved. Typically, the externally-applied mold closing pressures are 600 psig or higher.

Various modifications and variations of the invention will be apparent and are intended to be included within the scope of the invention as defined in the appended claims.

We claim:

1. A process for molding a rubber or plastic article from a blank within a mold cavity of a mold formed by a plurality of mating mold segments, said process comprising:

(a) forming a liquid film of a coating material on the surface of said mold cavity or on the surface of the blank from which the article is to be molded or on both the surface of said mold cavity and the surface of said blank immediately prior to closing said mold, said coating material having a boiling point above the ambient temperature of the work area in which the molding is performed and below the molding temperature at which the article will be molded;

(b) moving said mold with said blank loaded therein to the closed position and exerting externally-applied pressure to maintain said mold cavity in said closed position;

(c) raising the temperature within said mold cavity to a temperature above the boiling point of said coating material;

(d) reducing said externally-applied pressure maintaining said mold cavity in a closed position to expose vapor release passages existing between mating surfaces of said mold segments of said mold through which said coating material in vapor form can exhaust carrying with it air entrapped within said mold cavity as the mold is closed;

(e) re-exerting externally-applied pressure to return said mold cavity to the closed position;

(f) raising the temperature within said mold cavity to a molding temperature at which molding of the article will occur and maintaining said molding temperature for the required molding time period; and (g) opening said mold and removing the molded article therefrom.

2. The process of claim 1 wherein said coating material has a boiling point at least 10° C. above the ambient temperature of the work area in which the molding is to be performed and at least 10° C. below the molding temperature at which the article will be molded.

3. The process of claim 1 wherein said coating material is an aqueous material.

4. The process of claim 1 wherein said liquid film of coating material is applied to the surface of the blank from which the article is to be formed immediately before the blank is loaded into said mold cavity and the mold cavity is closed.

5. The process of claim 1 wherein the surface of the blank from which the article is to be formed has a surfactant applied thereto before said liquid film of coating material is formed on the surface of said blank.

6. The process of claim 5 wherein said film of coating material is formed on the surface of said blank by injecting saturated steam into said mold cavity with said blank loaded therein as said mold segments of said mold are moved to the closed position.

7. A mold for molding an article from a blank comprised of a rubber or plastic composition comprising mold segments mounted for movement to and from a closed mating relationship, and injection means for injecting a liquid material in vapor form into the space between said mold segments as said mold segments move to the closed position.

8. The mold of claim 7 wherein said injection means comprises a conduit within a mold section of said mold that connects at one end with means for conveying said liquid material in vapor form and under pressure to said conduit and at the other end connects with a valve housed within said mold segment that connects when said valve is in an open position with the mold cavity of the mold formed by said mold segments when moved to the closed position.

9. The mold of claim 7 wherein said valve housed within said mold segment is a poppet valve.

* * * * *